United States Patent
Shin et al.

(10) Patent No.: US 10,204,275 B2
(45) Date of Patent: Feb. 12, 2019

(54) IMAGE MONITORING SYSTEM AND SURVEILLANCE CAMERA

(71) Applicant: HANWHA TECHWIN CO.,LTD., Changwon-si (KR)

(72) Inventors: Dong Hak Shin, Changwon-si (KR); Ki Yong Jeon, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 453 days.

(21) Appl. No.: 14/480,750

(22) Filed: Sep. 9, 2014

(65) Prior Publication Data
US 2015/0092052 A1  Apr. 2, 2015

(30) Foreign Application Priority Data

Sep. 27, 2013  (KR) .................. 10-2013-0115708

(51) Int. Cl.
*H04N 5/77* (2006.01)
*H04N 7/18* (2006.01)
*H04N 9/82* (2006.01)
*G06K 9/00* (2006.01)

(52) U.S. Cl.
CPC ........... *G06K 9/00771* (2013.01); *H04N 5/77* (2013.01); *H04N 7/183* (2013.01); *H04N 9/8205* (2013.01); *H04N 9/8211* (2013.01); *G06K 2009/00738* (2013.01)

(58) Field of Classification Search
CPC .......... G06K 9/00771; G08B 13/19602; G08B 13/19608; G08B 13/19613; G08B 13/19615; G08B 13/19671; H04N 5/76; H04N 7/188
See application file for complete search history.

(56) References Cited

U.S. PATENT DOCUMENTS

| 6,028,626 A * | 2/2000 | Aviv | G06K 9/00771 348/152 |
| 2005/0280704 A1* | 12/2005 | Clare | G08B 13/1672 348/143 |
| 2010/0111314 A1 | 5/2010 | Jae Wook et al. | |
| 2012/0300022 A1* | 11/2012 | Kaneko | G08B 29/188 348/36 |

FOREIGN PATENT DOCUMENTS

| JP | 2004-70564 A | 3/2004 |
| JP | 2010-232888 A | 10/2010 |
| KR | 10-2004-0016024 A | 2/2004 |
| KR | 10-2010-0050114 A | 5/2010 |
| KR | 10-2011-0095196 A | 8/2011 |

* cited by examiner

*Primary Examiner* — Joseph G Ustaris
*Assistant Examiner* — Jill D Sechser
(74) *Attorney, Agent, or Firm* — Sughrue Mion, PLLC (57) ABSTRACT

An image monitoring system including a surveillance camera is provided. The surveillance camera includes: an image analyzer configured to analyze an input image; a sound source analyzer configured to analyze a sound source in the image or a sound source that is input separately; and a determiner configured to determine whether an abnormal image and an abnormal sound source exist, and when the abnormal image and the abnormal sound source are obtained, according to a result of the image analysis and the sound source analysis, to generate metadata and alarm information based on a result of the determination, wherein the abnormal image and the abnormal sound source are predefined.

17 Claims, 5 Drawing Sheets

| GENERATION TIME | TYPE OF ABNORMAL SOUND SOURCE | TYPE OF ABNORMAL IMAGE | CROSS CHECK | EVENT GENERATION NUMBER | MULTI DETECTION |
|---|---|---|---|---|---|
| 09:25:17 | SKID | – | No | 1 | SKID |
| 10:11:20 | COLLISION | COLLISION | Match | 1 | COLLISION —310 |
| 15:00:00 | ALARM SOUND | COLLISION | No | 2 | COLLISION —320 |
| 20:18:30 | MAN'S SCREAMIN | – | No | 1 | OUT OF RANGE |
| 23:43:09 | BABY'S CRYING | – | No | 2 | WOMAN'S SCREAMING |

FIG. 3B

| TYPE OF ABNORMAL SOUND SOURCE | | | TYPE OF ABNORMAL IMAGE | | | CROSS CHECK |
|---|---|---|---|---|---|---|
| FIRST PRIORITY | SECOND PRIORITY | THIRD PRIORITY | FIRST PRIORITY | SECOND PRIORITY | THIRD PRIORITY | |
| COLLISION (55%) | EXPLOSION (40%) | MAN'S SCREAMING (10%) | EXPLOSION (95%) | COLLISION (5%) | — | EXPLOSION |
| MAN'S SCREAMING (70%) | EXPLOSION (35%) | WOMAN'S SCREAMING (30%) | VIOLENCE (80%) | COLLISION (15%) | — | VIOLENCE |

IMAGE MONITORING SYSTEM AND SURVEILLANCE CAMERA

CROSS-REFERENCE TO THE RELATED APPLICATION

This application claims priority from Korean Patent Application No. 10-2013-0115708, filed on Sep. 27, 2013, in the Korean Intellectual Property Office, the disclosure of which is incorporated herein in its entirety by reference.

BACKGROUND

1. Field

Apparatuses and methods consistent with exemplary embodiments of the inventive concept relate to an image monitoring system that analyzes an image and/or a sound source to generate, store, and display metadata about an abnormal situation, a surveillance camera included in the image monitoring system, and a method of operating the surveillance camera.

2. Description of the Related Art

An image monitoring system generally includes a surveillance camera and an image recording apparatus such as a network video recorder (NVR or digital video recorder (DVR), and analyzes an image acquired via the surveillance camera by using an image analysis function to determine whether a surveillance scene is abnormal according to predefined rules.

When the number of surveillance cameras that simultaneously operate in an image monitoring system has increased, it is difficult for a user to check in real time whether all surveillance scenes are abnormal. Also, it is possible to determine a moving object through image analysis, but it is difficult to detect an abnormal situation. In addition, even though an abnormal situation is detected through image analysis, the detection result may be false.

SUMMARY

One or more embodiments of the inventive concept include an image monitoring system that analyzes an image and/or sound source to generate, store, and display metadata about an abnormal situation so as to increase the monitoring efficiency, a surveillance camera included in the image monitoring system, and a method of operating the surveillance camera.

Various aspects of exemplary embodiments will be set forth in part in the description which follows and, in part, will be apparent from the description, or may be learned by practice of the embodiments.

According to an aspect of an exemplary embodiment, there is provided a surveillance camera which may include: an image analyzer configured to analyze an input image; a sound source analyzer configured to analyze a sound source in the image or a sound source that is input separately; and a determiner configured to determine whether an abnormal image and an abnormal sound source exist, and when the abnormal image and the abnormal sound source are obtained, according to a result of the image analysis and the sound source analysis, to generate metadata and alarm information based on a result of the determination, wherein the abnormal image and the abnormal sound source are predefined.

With regard to the determiner, if it is determined that the abnormal image and the abnormal sound source are simultaneously obtained, the determiner may further determine whether the abnormal sound source is input from the abnormal image or an outside of the abnormal image.

If it is determined by the determiner that the abnormal image and the abnormal sound source are simultaneously obtained, and the abnormal sound source is obtained from the outside of the abnormal image, a metadata generator included in the surveillance camera may generate metadata about each of the abnormal image and the abnormal sound source.

If it is determined by the determiner that the abnormal image and the abnormal sound source are simultaneously obtained, and the abnormal sound source is obtained from the abnormal image, the determiner may further determine whether the abnormal image and the abnormal sound source indicate a same event.

The surveillance camera may further include the metadata generator configured to generate the metadata comprising times when the abnormal image and the abnormal sound source are obtained, respectively, types of the abnormal image and the abnormal sound source, a number of events indicated by the abnormal image and the abnormal sound source, whether the abnormal sound source is obtained from the abnormal image or an outside of the abnormal image, and whether the abnormal image and the abnormal sound source indicate a same event, with reference to the determination result of the determiner. The surveillance camera may also include an alarm information generator configured to generate the alarm information about the abnormal image and the abnormal sound source with reference to the determination result of the determiner and the metadata.

The types of the abnormal sound source and the abnormal image each may include a plurality of candidates and accuracy information about the candidates, and the determiner may determine whether the abnormal image and the abnormal sound source indicate the same event with reference to the plurality of candidates corresponding to the types of the abnormal image and the abnormal sound source and the accuracy information.

If it is determined by the determiner that a sum of a probability of a type of the abnormal image corresponding to a preset event and a probability of a type of the abnormal sound source corresponding to the preset event exceeds a preset threshold value, the determiner may further determine that the abnormal image and the abnormal sound source indicate the preset event.

If it is determined by the determiner that the abnormal image and the abnormal sound source are simultaneously obtained, the determiner may further determine whether the abnormal sound source is obtained from the abnormal image or an outside of the abnormal image.

If it is determined by the determiner that the abnormal image and the abnormal sound source are simultaneously obtained, and the abnormal sound source is obtained from the outside of the abnormal image, the metadata generator may generate the metadata about each of the abnormal image and the abnormal sound source.

If it is determined by the determiner that the abnormal image and the abnormal sound source are simultaneously obtained, and the abnormal sound source is obtained from the abnormal image, the determiner may further determine whether the abnormal image and the abnormal sound source indicate the same event, and if it is determined by the determiner that the abnormal image and the abnormal sound source indicate the same event, the metadata generator may reduce the number of events indicated by the abnormal image and the abnormal sound source from the metadata.

If it is determined by the determiner that the abnormal image and the abnormal sound source are simultaneously obtained, the abnormal sound source is obtained from the abnormal image, and the abnormal sound source and the abnormal image indicate different events, the metadata generator may generate the metadata about each of the abnormal image and the abnormal sound source.

According to an aspect of another exemplary embodiment, there is provided a monitoring system including the above surveillance camera; an image recording apparatus configured to receive the image, the metadata and the alarm information from the camera, store the image, the metadata and the alarm information, and perform processing for displaying the alarm information; and a display apparatus configured to display the image, the metadata, and the alarm information.

According to an aspect of still another exemplary embodiment, there is provided a method of controlling a surveillance camera, the method including: analyzing an input image; analyzing a sound source in the image or a sound source that is input separately; determining whether an abnormal image and an abnormal sound source exist, and when the abnormal image and the abnormal sound source are obtained, according to a result of the image analysis and the sound source analysis; generating metadata and alarm information based on a result of the determining, wherein the abnormal image and the abnormal sound source are predefined.

The determining may include determining whether the abnormal sound source is obtained from the abnormal image or an outside of the abnormal image.

The determining may also include determining whether the abnormal image and the abnormal sound source indicate a same event.

The metadata includes information about when the abnormal image and the abnormal sound source are obtained, respectively, types of the abnormal image and the abnormal sound source, a number of events indicated by the abnormal image and the abnormal sound source, whether the abnormal sound source is obtained from the abnormal image or an outside of the abnormal image, and whether the abnormal image and the abnormal sound source indicate a same event, with reference to a result of the determining.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Reference will now be made in detail to exemplary embodiments in reference to the accompanying drawings, in which like reference numerals refer to like elements throughout. In this regard, the present embodiments may have different forms and should not be construed as being limited to the descriptions set forth herein. Accordingly, the embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Figure 1:
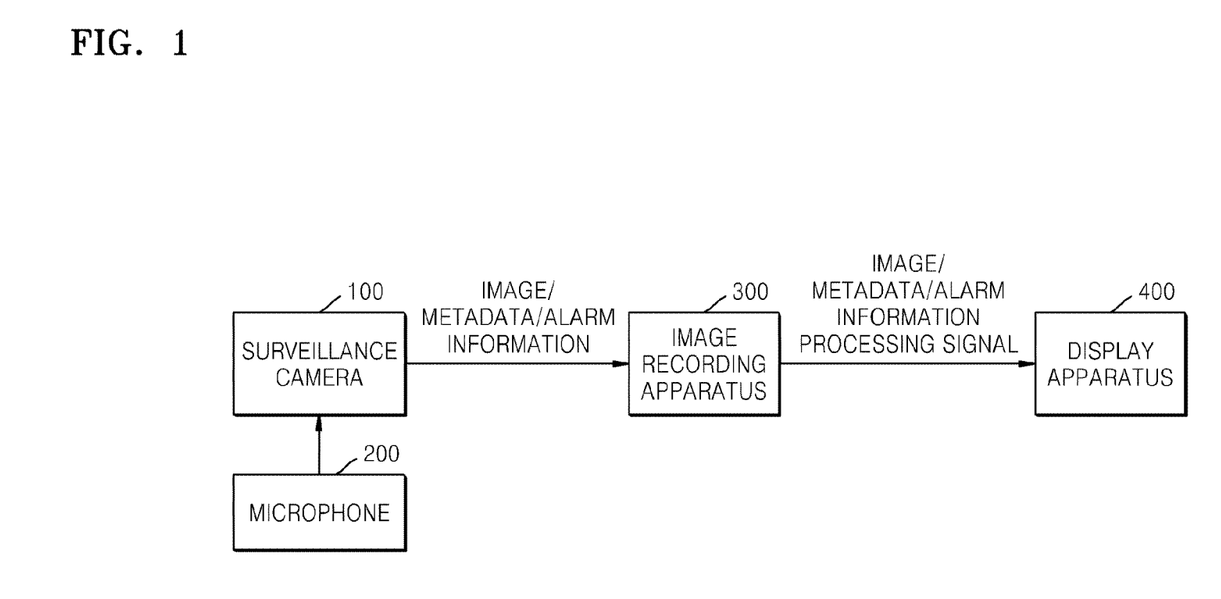
FIG. 1 is a block diagram illustrating an image monitoring system according to an exemplary embodiment.

FIG. 1 is a block diagram illustrating an image monitoring system according to an exemplary embodiment.

Referring to FIG. 1, the image monitoring system includes a surveillance camera 100, a microphone 200, an image recording apparatus 300, and a display apparatus 400.

The surveillance camera 100 may be a single fixed camera including a fixed lens and having a fixed capturing range or a pan-tilt-zoom (PTZ) camera having a variable capturing range. If the surveillance camera 100 is a PTZ camera, the surveillance areas may be easily changed through a pan motion in a horizontal direction, a tilt motion in a vertical direction, and a zoom-in and/or zoom-out motion. The PTZ camera may have a uniform resolution and may horizontally and vertically rotated, in comparison with the single fixed camera, to thereby acquire images in all directions. The surveillance camera 100 is connected to the image recording apparatus 300 that may be a DVR. If the surveillance camera 100 is a network camera, the surveillance camera 100 may be connected to the image recording apparatus 300 through a network. In this case, the image recording apparatus 300 may be an NVR.

In the present exemplary embodiment, although only one surveillance camera 100 is shown in the image monitoring system of FIG. 1, the image monitoring system may include more surveillance cameras 100 that analyze one or more images and/or sound sources from the input images to determine whether an abnormal image exists, a sound source exists, or an abnormal image and sound source exist in order to generate metadata and alarm information. The sound source may be included in or obtained from an image captured by the surveillance camera 100 or may be directly input to the surveillance camera 100 through the microphone 200. The surveillance camera 100 will be described in detail with reference to FIG. 2.

The image recording apparatus 300 receives the image, the metadata, and the alarm information from the surveillance camera 100, stores the image, the metadata, and the alarm information, and performs display processing of the alarm information. The display processing of the alarm information refers to processing, such as flickering or highlighting, performed on the image or the metadata displayed on the display apparatus 400. As presented above, the image recording apparatus 300 may be a DVR or an NVR according to a type of the surveillance camera 100.

The display apparatus 400 displays the image, the metadata, and the processed alarm information output from the image recording apparatus 300. The display apparatus 400 may divide a screen according to the number of surveillance cameras 100 and display images respectively captured by each of the surveillance cameras 100 through the image recording apparatus 300.

Figure 2:
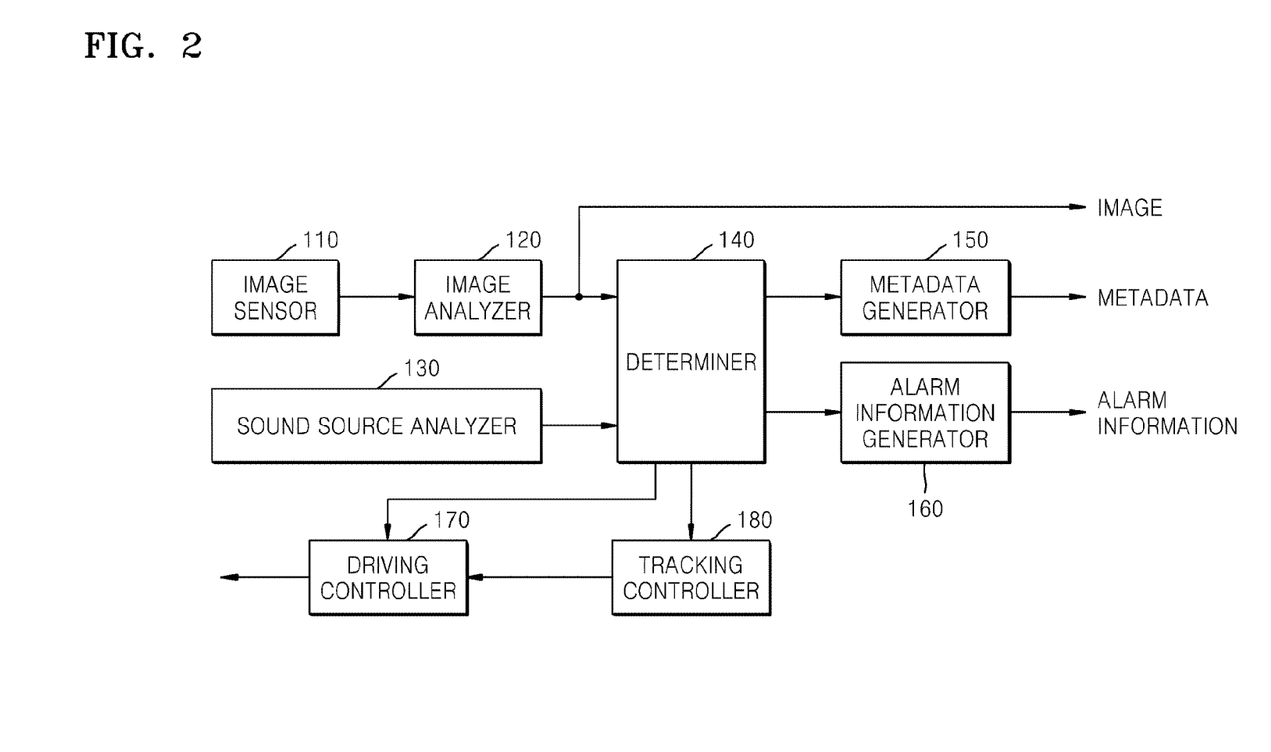
FIG. 2 is a block diagram illustrating a detailed structure of a surveillance camera of the image monitoring system of FIG. 1, according to an exemplary embodiment.

FIG. 2 is a block diagram illustrating a detailed structure of the surveillance camera 100 of FIG. 1. Referring to FIG. 2, the surveillance camera 100 includes an image sensor 110, an image analyzer 120, a sound source analyzer 130, a determiner 140, a metadata generator 150, an alarm information generator 160, a driving controller 170, and a tracking controller 180.

The image sensor 110 converts an optical signal bouncing off a subject and passing through a lens (not shown) of the surveillance camera 100 into an electric signal (an image signal) and outputs the electric signal. The image sensor 110 may also be a complementary metal-oxide semiconductor (CMOS) module or a charge-coupled device (CCD) module.

Image processing may be performed on an image output from the image sensor 110. The image processing may be performed by the image analyzer 120 or another module. In the present exemplary embodiment, for convenience of description, the image processing will be described as being performed by the image analyzer 120.

The image analyzer 120 reduces noise from the image signal output from the image sensor 120 and may perform image signal processing for improving an image quality, such as a gamma correction, a color filter array interpolation, a color matrix, a color correction, a color enhancement, or the like. The image analyzer 120 may also functionally perform color processing, blur processing, edge enhancement processing, image analysis processing, image recognition processing, image effect processing, or the like on the image signal output from the image sensor 110. The image analyzer 120 may perform face recognition, scene recognition, or the like through the image recognition processing. For example, the image analyzer 120 may perform luminance level adjusting, color correction, contrast adjusting, contour emphasis adjusting, screen division processing, character image generating, image synthesis process, or the like.

Also, the image analyzer 120 performs an image analysis on the image signal output from the image sensor 110, and if the analysis result satisfies a preset event generation condition, generates an event. According to an exemplary embodiment, the image analysis refers to tracking to detect disappearance or appearance of an object in a screen, image tracking of an object similar to a particular image input by a user, sensing a motion of the object, screen blackout, or the like, and if the image analysis result satisfies the preset generation condition, an abnormal image is detected to generate an event.

The sound source analyzer 130 analyzes a sound source that is included in or obtained from the image signal output from the image sensor 110 or is directly input through the microphone 200, and if the analysis result satisfies an event generation condition, generates an event. In this case, the sound source analysis analyzes a sound source having a size greater than or equal to a threshold value designated by the user or a sound source specified by the user to generate the event. In addition, several types of abnormal sound sources may be included into a database (DB), the analyzed sound source may be compared with the sound sources stored in the DB, and if the analyzed sound source corresponds to the stored sound sources, an event may be generated.

The event generation condition used in the image analysis corresponds to an appearance of an object, a generation of an image specified by the user (for example, an appearance of a unrecognizable face), a change in a screen color, a motion occurring in a set area, or the like and may be preset. The event generation condition used in the sound source analysis corresponds to generation of an abnormal sound (a friction sound (skid) of a car tire, a glass breaking sound, an alarm sound, a collision sound, or the like), generation of a sound specified by the user (for example, a man's screaming, woman's screaming, baby's crying sound, or the like), generation of a sound with an amplitude higher than or equal to a threshold value, or the like, and may be preset.

The determiner 140 may determine whether an abnormal image exists, an abnormal sound exists, or an abnormal image and an abnormal sound source simultaneously exist according to an image analysis result and/or a sound source analysis result. In particular, if it is determined that an abnormal image and an abnormal sound source simultaneously exist, the determiner 140 determines whether the abnormal sound source is obtained from the abnormal image or an outside of the abnormal image. Also, if the abnormal sound source is obtained from the abnormal image, the determiner 140 determines whether the abnormal image and the abnormal sound source indicate a same event. The determiner 140 performs multiple determinations as described above because a result of the generated metadata varies according to a determination result of the determiner 140.

The metadata generator 150 generates metadata about the abnormal image, metadata about the abnormal sound source, and metadata about the abnormal image and the abnormal sound source with reference to the determination result of the determiner 140. The metadata refers to data that provides information about original data (an image, a sound source, or the image and the sound source) and describes another data. In the present exemplary embodiment, the metadata generator 150 generate metadata including a number of times of generating the abnormal image and/or the abnormal sound source, analysis results and types of the abnormal image and/or the abnormal sound source, a number of generated events indicated by the abnormal image and/or the abnormal sound source, whether the abnormal sound source is obtained from the abnormal image, and whether the abnormal image and the abnormal sound source indicate a same event with reference to the determination result of the determiner 140.

Figure 3A:
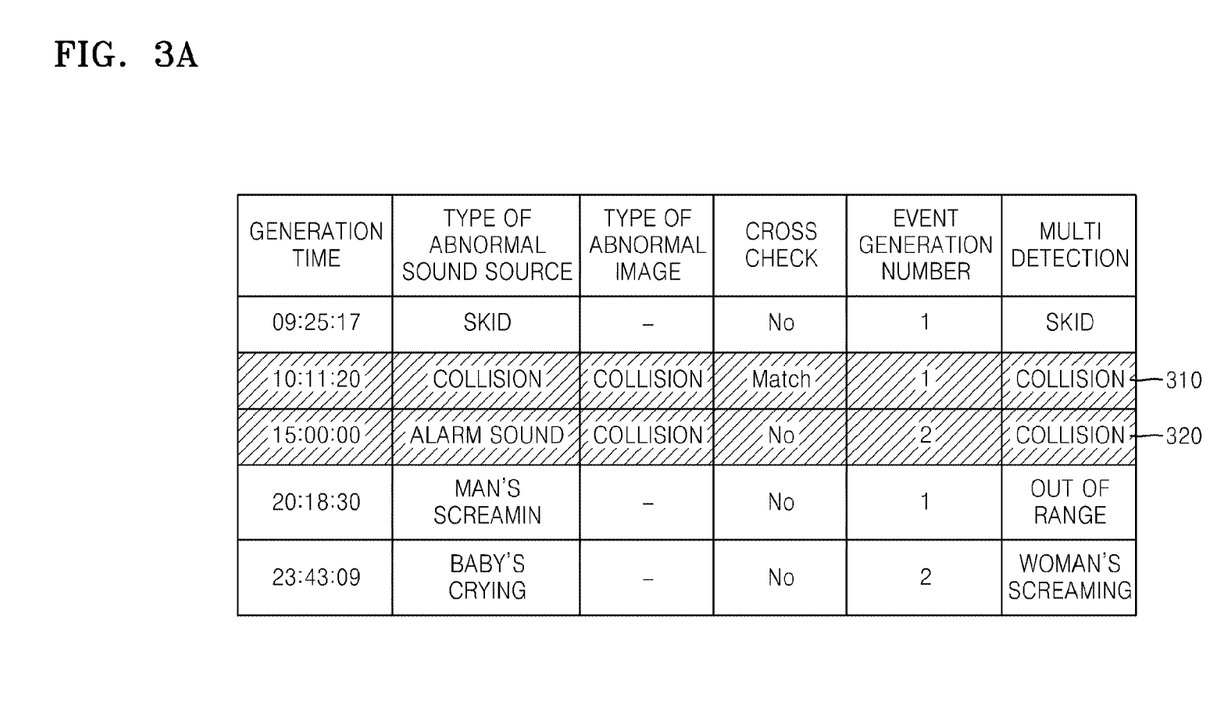
FIGS. 3A and 3B are views illustrating metadata that are generated by the surveillance camera of the image monitoring system of FIG. 1, according to an exemplary embodiment.
Figure 3B:
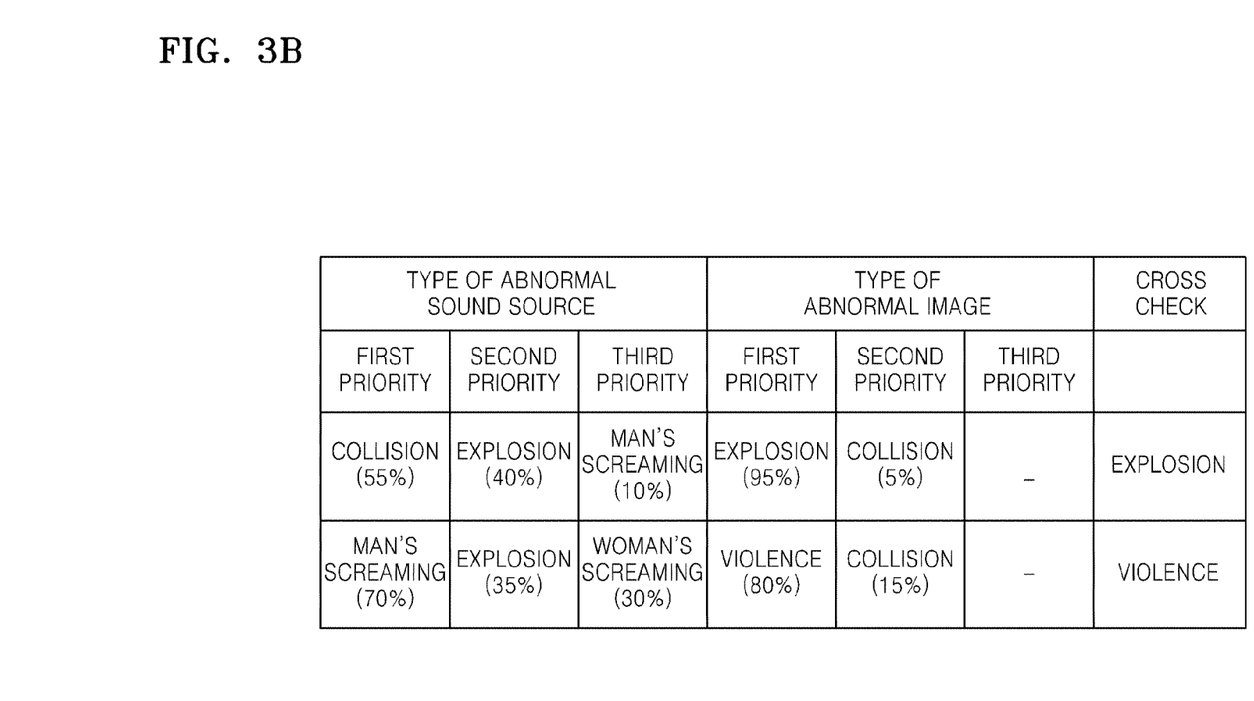

FIGS. 3A and 3B are views illustrating metadata that are generated by the metadata generator 150, according to an exemplary embodiment.

Referring to FIG. 3A, the metadata is classified into items of a generation time, an abnormal sound source type, an abnormal image type, a cross check, a number of event generations, and multi-detection. The multi detection item indicates a determination result of whether an abnormal sound source is obtained from an abnormal image. Specifically, the multi detection item indicates a determination result of recognizing a position in which the abnormal sound source is generated and whether the recognized position is obtained from the abnormal image. The cross check item indicates a determination result of whether the abnormal image and the abnormal sound source indicate a same event. In other words, the cross check item indicates a determination result of whether the abnormal image and the abnormal sound source are a same type of events.

FIG. 3B illustrates a process of the determiner 140 of FIG. 2 that performs a cross check with reference to an abnormal image and an abnormal sound source, according to an exemplary embodiment. Referring to FIG. 3B, a type of the abnormal sound source and a type of the abnormal image are not determined as one type, and may each includes a plurality of candidates and also includes accuracies of the respective candidates. For example, first metadata shown in FIG. 3B indicates that a probability of the abnormal sound source corresponding to a collision is 55%, a probability of the abnormal sound source corresponding to an explosion is 40%, and a probability of the abnormal sound source corresponding to man's screaming is 10%. Also, the first metadata shown in FIG. 3B indicates that a probability of the abnormal image corresponding to an explosion is 95% and a probability of the abnormal image corresponding to a collision is 5%. A cross check result obtained from these analysis results may indicate an explosion.

If the type of the abnormal sound source and the type of the abnormal image are shown as various candidates, and the candidates include accuracies, the cross check may be performed with reference to the candidates of the types of the abnormal sound source and the abnormal image and the accuracies of the candidates. For example, with reference to the first metadata shown in FIG. 3B, a probability of the abnormal sound source being a collision and a probability of the abnormal image being an explosion are the highest, and thus, the types of the abnormal sound source and the abnormal image do not correspond to each other. However, if a sum of the probability (40%) of the abnormal sound source being the explosion and the probability (95%) of the abnormal image being the explosion exceeds a preset threshold value (for example, 130%), the result of the cross check may be determined as an explosion. For example, with reference to second metadata shown in FIG. 3B, if a sum of a probability (70%) of the abnormal sound source being man's screaming, a probability (30%) of the abnormal sound source being woman's screaming, and a probability (80%) of the abnormal sound source being a violent event exceeds a preset threshold value, the result of the cross check may be determined as being a violent event. In this case, a man's screaming and a woman's screaming may be regarded as a same type of events in order to sum the accuracies, acquire a maximum value, or acquire an average value in order to use values of the accuracies.

A detailed method of performing the cross check by using the accuracies of the candidates is not limited to the above-described methods, and other various methods may be used.

If the determiner 140 determines that an abnormal sound source is obtained from the abnormal image, and the abnormal image and the abnormal sound source indicate a same event, the metadata generator 150 subtracts the number of generated events from generated metadata. Referring to reference numeral 310 of FIG. 3A, since the abnormal sound source and the abnormal image of various types indicate the same event, the number of generated events is subtracted from the metadata. That is, the number of events is changed from two to one. Referring to reference numeral 320 of FIG. 3A, since the abnormal sound source and the abnormal image of various types indicate different events, the number of generated events is maintained.

However, if the determiner 140 determines that the abnormal image and the abnormal sound source are obtained differently, the abnormal sound source is obtained from an outside the abnormal image, and the abnormal sound source and the abnormal image indicate different events, the metadata generator 150 generates metadata about each of the abnormal image and the abnormal sound source.

The alarm information generator 160 generates alarm information about the abnormal image and/or the abnormal sound source with reference to the determination result of the determiner 140 and the generated metadata. The alarm information generator 160 may generate alarm information about the abnormal image and/or the abnormal sound source in which the larger number of events exist or alarm information about a particular abnormal image (e.g., a collision, or the like) or a particular abnormal sound source (e.g., woman's screaming, or the like).

The driving controller 170 controls driving of the surveillance camera 100. For example, the driving controller 170 controls panning, tilting, and zooming operations, etc. of the surveillance camera 100. If the surveillance camera is a fixed camera, the driving controller 170 may be omitted.

The tracking controller 180 outputs a tracking control signal to the driving controller 170 with reference to the determination result of the determiner 140. The surveillance camera 100 is driven according to the tracking control signal of the tracking controller 180 to track a target. For example, if the surveillance camera 100 is a zoom camera, and the abnormal sound source exists outside the abnormal image according to a multi detection determination result of the determiner 140, the tracking controller 180 may output a control signal to the driving controller 170 to enable the surveillance camera 100 to zoom out and then capture a wider area.

According to another exemplary embodiment, if the surveillance camera 100 is a PTZ camera, and the abnormal sound source exists outside the abnormal image according to the multi detection determination result of the determiner 140, the tracking controller 180 may output a control signal to the driving controller 170 to track a position where the abnormal sound source is generated. If a plurality of abnormal sound sources are simultaneously generated, tracking may be performed according to priorities with reference to metadata of the respective abnormal sound sources. For example, if a plurality of events simultaneously occur, tracking may be performed according to types and priorities of the events.

As a tracking result, an image and data may be displayed on the display apparatus 400 or may be stored in an additional storage device. If the surveillance camera 100 is a fixed camera, tracking and driving controls may not be performed.

The image, the metadata, and the alarm information generated by the surveillance camera 100 are displayed on the display apparatus 400 through the image recording apparatus 300. In this case, the image recording apparatus 300 performs processing for the display of the alarm information.

As described above, metadata about an abnormal situation may be generated, stored, and displayed through an image and/or sound source analysis to increase monitoring efficiency. An abnormal situation occurring in a blind area of the surveillance camera 100 may be checked, and a subsequent search for the abnormal situation may become easy according to the generation of the metadata. Also, when the metadata is generated, whether the abnormal sound source is obtained from the abnormal image and whether the abnormal image and the abnormal sound source indicate the same event may be determined to reduce repeated or false alarms.

Figure 4:
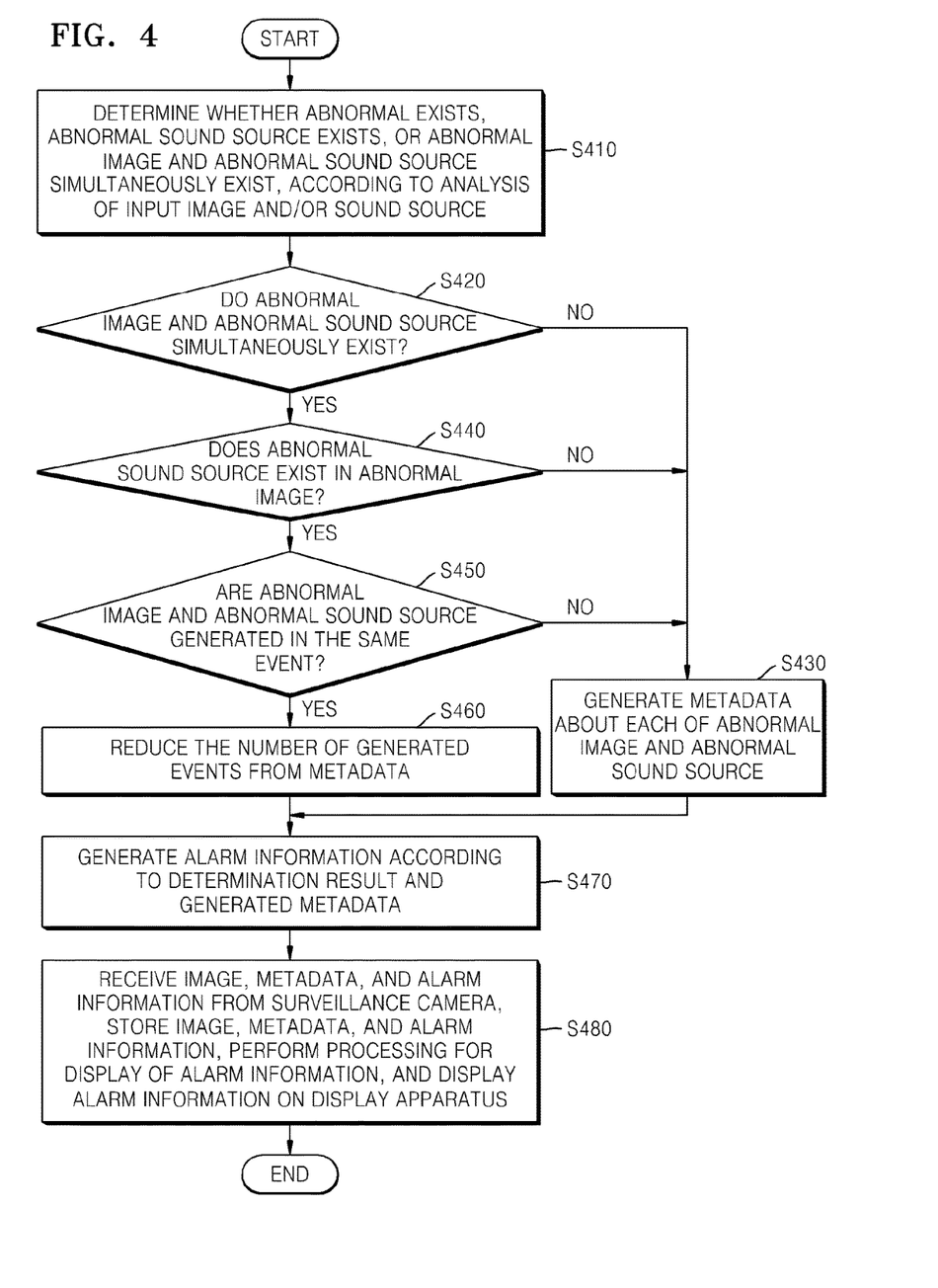
FIG. 4 is a flowchart of a method of operating an image monitoring system, according to an exemplary embodiment.

FIG. 4 is a flowchart of a method of operating an image monitoring system, according to an exemplary embodiment. In the following description, descriptions of parts overlapping the descriptions of FIGS. 1 through 3 are omitted.

Referring to FIG. 4, in operation S410, the surveillance camera 100 determines whether an abnormal image exists, an abnormal sound source exists, or an abnormal image and an abnormal sound source simultaneously exist, according to an analysis of an input image and/or a sound source input through the microphone 200.

If it is determined in operation S420 that the abnormal image and the abnormal sound source do not simultaneously exist, the surveillance camera 100 generates metadata of each of the abnormal image and the abnormal sound source in operation S430.

However, if it is determined in operation S420 that the abnormal image and the abnormal sound source simultaneously exist, the surveillance camera 100 determines whether the abnormal sound source exists in the abnormal image in operation s440.

If it is determined in operation S40 that the abnormal sound source exists outside the abnormal image, the surveillance camera 100 generates metadata about each of the abnormal image and the abnormal sound source in operation S430.

However, if it is determined in operation S440 that the abnormal sound source exists in the abnormal image, the surveillance camera 100 determines whether the abnormal image and the abnormal sound source are generated in a same event in operation S450.

If it is determined in operation S450 that the abnormal image and the abnormal sound source are generated in different events, the surveillance camera 100 generates metadata about each of the abnormal image and the abnormal sound source in operation S430.

If it is determined in operation S450 that the abnormal image and the abnormal sound source are generated in the same event, the surveillance camera 100 subtracts the number of generated events when generating the metadata in operation S460.

If the metadata is completely generated, the surveillance camera 100 generates alarm information with reference to the determination result and the metadata in operation S470.

In operation S480, the image recording apparatus 300 receives the image, the metadata, and the alarm information from the surveillance camera 100, stores the image, the metadata, and the alarm information, performs processing for a display of the alarm information, and displays the alarm information on the display apparatus 400.

As described above, according to the one or more of the above embodiments, metadata about an abnormal situation may be generated, stored, and displayed through an analysis of an image and/or sound source to increase monitoring efficiency. Also, an abnormal situation occurring in a blind area of a camera may be checked, and a subsequent search for the abnormal situation may be become easy according to the generation of the metadata. In addition, whether an abnormal sound source exists in an abnormal image and whether the abnormal image and the abnormal sound source are generated in the same event may be determined to reduce repeated or false alarms.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. A surveillance camera comprising:
an image analyzer configured to analyze an input image;
a sound source analyzer configured to analyze a sound source in the input image or a sound source that is input separately;
a determiner configured to determine whether an abnormal image exists, an abnormal sound source exists, and the abnormal image and the abnormal sound source simultaneously exist, and when the abnormal image and the abnormal sound source are obtained, according to a result of the image analysis and the sound source analysis; and
a metadata generator configured to generate metadata comprising times when the abnormal image and the abnormal sound source are obtained, respectively, types of the abnormal image and the abnormal sound source, a number of events indicated by the abnormal image and the abnormal sound source, whether the abnormal sound source is obtained from the abnormal image or an outside of the abnormal image, and whether the abnormal image and the abnormal sound source indicate a same event, based on a result of the determination of the determiner; and
an alarm information generator configured to generate alarm information about the abnormal image and the abnormal sound source based on the metadata and the result of the determination of the determiner,
wherein the abnormal image and the abnormal sound source are predefined,
wherein the determiner performs, in response to determining that the abnormal image and the abnormal sound source simultaneously exist, multiple determinations to generate the metadata which varies according to a determination result, and the determiner generates, in response to determining that the abnormal image and the abnormal sound source do not simultaneously exist, the metadata of each of the abnormal image and the abnormal sound source,
wherein the multiple determinations comprise performing a cross-check between the abnormal image and the abnormal sound source by comparing, with a threshold value, a sum of a first probability of the abnormal image being a candidate event and a second probability of the abnormal sound source being the candidate event, and
wherein if it is determined by the determiner that the abnormal image and the abnormal sound source are simultaneously obtained, the determiner further determines whether the abnormal sound source is obtained from the abnormal image or an outside of the abnormal image.

2. The surveillance camera of claim 1, wherein if it is determined by the determiner that the abnormal image and the abnormal sound source are simultaneously obtained, the determiner further determines whether the abnormal sound source is input from the abnormal image or an outside of the abnormal image.

3. The surveillance camera of claim 2,
wherein if it is determined by the determiner that the abnormal image and the abnormal sound source are simultaneously obtained, and the abnormal sound source is obtained from the outside of the abnormal image, the metadata generator generates the metadata about each of the abnormal image and the abnormal sound source.

4. The surveillance camera of claim 2, wherein if it is determined by the determiner that the abnormal image and the abnormal sound source are simultaneously obtained, and the abnormal sound source is obtained from the abnormal image, the determiner further determines whether the abnormal image and the abnormal sound source indicate the same event.

5. The surveillance camera of claim 1, wherein the types of the abnormal sound source and the abnormal image each comprises a plurality of candidates and accuracy information about the plurality of candidates, and wherein the determiner determines whether the abnormal image and the abnormal sound source indicate the same event with reference to the plurality of candidates corresponding to the types of the abnormal image and the abnormal sound source and the accuracy information.

6. The surveillance camera of claim 5, wherein if it is determined by the determiner that the sum of the first probability of the abnormal image corresponding to the candidate event and the second probability of the abnormal sound source corresponding to the candidate event exceeds the threshold value, the determiner further determines that the abnormal image and the abnormal sound source indicate the candidate event.

7. The surveillance camera of claim 1, wherein if it is determined by the determiner that the abnormal image and the abnormal sound source are simultaneously obtained, and the abnormal sound source is obtained from the outside of the abnormal image, the metadata generator generates the metadata about each of the abnormal image and the abnormal sound source.

8. The surveillance camera of claim 1, wherein if it is determined by the determiner that the abnormal image and the abnormal sound source are simultaneously obtained, and the abnormal sound source is obtained from the abnormal image, the determiner further determines whether the abnormal image and the abnormal sound source indicate the same event, and if it is determined by the determiner that the abnormal image and the abnormal sound source indicate the same event, the metadata generator reduces the number of events indicated by the abnormal image and the abnormal sound source from the metadata.

9. The surveillance camera of claim 8, wherein if it is determined by the determiner that the abnormal image and the abnormal sound source are simultaneously obtained, the abnormal sound source is obtained from the abnormal image, and the abnormal sound source and the abnormal image indicate different events, the metadata generator generates the metadata about each of the abnormal image and the abnormal sound source.

10. A monitoring system comprising:
the surveillance camera of claim 1;
an image recording apparatus configured to receive the input image, the metadata and the alarm information from the surveillance camera, store the input image, the metadata and the alarm information, and perform processing for displaying the alarm information; and
a display apparatus configured to display the input image, the metadata, and the alarm information.

11. The monitoring system of claim 10, wherein if it is determined by the determiner that the abnormal image and the abnormal sound source are simultaneously obtained, the determiner further determines whether the abnormal sound source is input from the abnormal image or an outside of the abnormal image.

12. The monitoring system of claim 11,
wherein if it is determined by the determiner that the abnormal image and the abnormal sound source are simultaneously obtained, and the abnormal sound source is obtained from the outside of the abnormal image, the metadata generator generates metadata about each of the abnormal image and the abnormal sound source.

13. The monitoring system of claim 11, wherein if it is determined by the determiner that the abnormal image and the abnormal sound source are simultaneously obtained, and the abnormal sound source is obtained from the abnormal image, the determiner further determines whether the abnormal image and the abnormal sound source indicate a same event.

14. A method of controlling a surveillance camera, the method comprising:
analyzing an input image;
analyzing a sound source in the input image or a sound source that is input separately;
determining whether an abnormal image exists, an abnormal sound source exists, and the abnormal image and the abnormal sound source simultaneously exist, and when the abnormal image and the abnormal sound source are obtained, according to a result of the image analysis and the sound source analysis;
generating metadata comprising times when the abnormal image and the abnormal sound source are obtained, respectively, types of the abnormal image and the abnormal sound source, a number of events indicated by the abnormal image and the abnormal sound source, whether the abnormal sound source is obtained from the abnormal image or an outside of the abnormal image, and whether the abnormal image and the abnormal sound source indicate a same event, based on a result of the determining; and
generating alarm information about the abnormal image and the abnormal sound source based on the metadata and the result of the determining,
wherein the abnormal image and the abnormal sound source are predefined,
wherein the generating comprises performing, in response to determining that the abnormal image and the abnormal sound source simultaneously exist, multiple determinations to generate metadata which varies according to a determination result, and generating, in response to determining that the abnormal image and the abnormal sound source do not simultaneously exist, metadata of each of the abnormal image and the abnormal sound source,
wherein the multiple determinations comprise performing a cross-check between the abnormal image and the abnormal sound source by comparing, with a threshold value, a sum of a first probability of the abnormal image being a candidate event and a second probability of the abnormal sound source being the candidate event, and
wherein method further comprises, if it is determined that the abnormal image and the abnormal sound source are simultaneously obtained, determining whether the abnormal sound source is obtained from the abnormal image or an outside of the abnormal image.

15. The method of claim 14, wherein the determining comprises determining whether the abnormal sound source is obtained from the abnormal image or an outside of the abnormal image.

16. The method of claim 15, wherein the determining comprises determining whether the abnormal image and the abnormal sound source indicate the same event.

17. The method of claim 14, wherein the types of the abnormal sound source and the abnormal image each comprises a plurality of candidates and accuracy information about the plurality of candidates, and
wherein the determining comprises determining whether the abnormal image and the abnormal sound source indicate the same event with reference to the plurality of candidates corresponding to the types of the abnormal image and the abnormal sound source and the accuracy information.

* * * * *